May 15, 1934.  L. F. SPEAR  1,959,222
AUTOMATIC DRAFT REGULATOR
Filed April 2, 1932
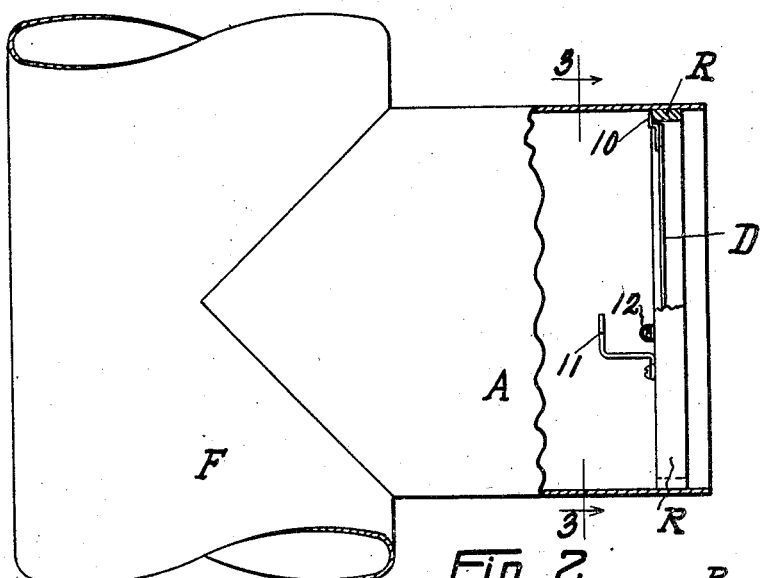
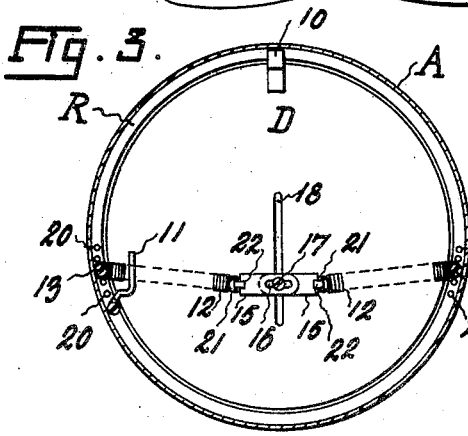
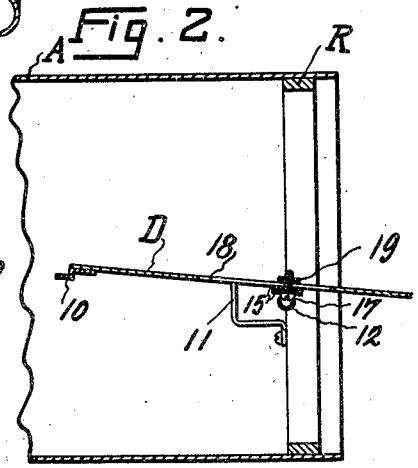
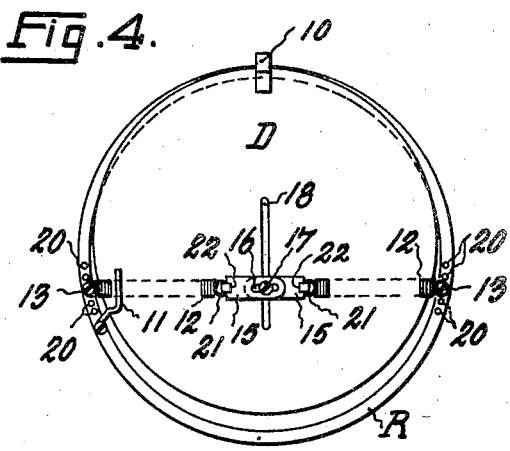
INVENTOR
LEOLYN F. SPEAR
BY
ATTORNEY Patented May 15, 1934

1,959,222

UNITED STATES PATENT OFFICE 1,959,222

AUTOMATIC DRAFT REGULATOR

Leolyn F. Spear, Westfield, Mass., assignor to Gilbert & Barker Manufacturing Company, West Springfield, Mass., a corporation of Massachusetts Application April 2, 1932, Serial No. 602,729

6 Claims. (Cl. 236—45)

This invention relates to improvements in automatic draft regulators.

The invention has for one of its objects to provide spring suspension means for supporting the damper for swinging movement, thereby eliminating the usual troublesome factor of pivot friction and avoiding the expense of carefully made anti-friction bearings usually used to secure sensitivity and ease of swinging movement of the damper.

Another object of the invention is to utilize the suspension springs also as torsion springs, twisting and untwisting them as the damper opens and closes and making the torsional stress of such springs resist the opening movement of the damper by air pressure.

Other objects of the invention will appear as the detailed description proceeds and will be pointed out in the appended claims.

The invention will be disclosed for illustrative purposes with reference to the accompanying drawing, in which:

Fig. 1 is a side elevational view, partly in section, showing a flue pipe in which the draft regulator is mounted, the damper being shown in fully closed position;

Fig. 2 is a similar but fragmentary view showing the damper in open position;

Fig. 3 is a cross sectional view taken on the line 3—3 of Fig. 1; and

Fig. 4 is a view of the damper and its mounting ring, showing the relationship which exists between these parts when they lie in a horizontal rather than a vertical plane.

Referring to the drawing; F indicates a flue or other passage, in which the draft is to be maintained substantially constant at a predetermined value, and A is an air inlet to this flue, which inlet is controlled by the damper D. This damper is supported for swinging movement in a novel manner from an annular ring R, mounted within the air inlet pipe A and suitably fixed thereto. Damper D can swing inwardly (counterclockwise) from the closed position shown in Fig. 1 to the fully open position shown in Fig. 2. A stop 10, fixed to damper D, may be provided for abutment with the inner end face of ring R to prevent outward swinging movement of the damper beyond its normal closed position. A stop 11, fixed to ring R, is positioned in the path of swinging movement of the damper and arrests it in its inward swinging movement when it reaches the fully open position shown in Fig. 2.

Damper D is supported from ring R for swinging movement in the novel manner shown in Fig. 3.

Two coil springs 12, connected at their inner and adjacent ends to damper D, one on each side of the vertical center line thereof, are suitably connected at their outer ends to ring R, as by the screws 13. A line passed through the centers of screws 13 will lie parallel with but below the horizontal diameter of the ring. The two center lines of the springs 12, however, converge downwardly to a point below such line because the springs move down under the weight of damper D until such weight is balanced by the tension of the springs.

As originally assembled, with the ring R lying in a horizontal rather than a vertical plane and as shown in Fig. 4, the damper D is placed eccentrically of the ring with the upper part of the damper overlapping the ring. The springs 12 are then applied and adjusted as to tension so that the damper will move down under its weight into concentric relation with the ring, when the ring is turned into a vertical plane as shown in Fig. 3. To enable adjustment of the tension of springs 12, each may be secured to a small plate 15 having a longitudinal slot 16. These plates overlap and a screw 17 is passed through the slots 16 in the overlapping plates and through a vertical slot 18 in the damper and the plates are camped to the damper by a nut 19. By loosening this nut slightly, the plates 15 or either of them, may be moved toward or away from screws 13 to adjust the tension of the springs.

The position of the pivotal axis of the damper may also be varied in any suitable way. As shown, a series of threaded holes 20 are provided for each screw 13 and each screw may be applied to any one hole of its series, thereby enabling the axis of rotation of the damper to be moved toward or away from its horizontal diametrical axis. The slot 18 in the damper enables the points of attachment of the springs 12 to damper D to be varied as may be necessary, to correspond with the various positions of screws 13. Variation of the position of the axis of rotation of the damper will cause a variation of the resistance to opening movement of the damper, such resistance increasing or decreasing as the axis is moved further away or nearer to the horizontal diameter of the damper.

The coil springs 12 are so secured that they can be twisted by the damper, as it swings inwardly toward open position, and so that by subsequently untwisting they can move the damper towards and into closed position. These springs thus act as torsion springs and each is given a certain initial degree of twist before being secured in place. Usually from one-quarter to one-half turn is all that is required because the damper is of very light weight. The torsion of each spring may be varied by removing the eye 21 from the hook 22 which holds it, twisting the spring to the degree desired and replacing the eye beneath the hook. Variation of the torsion of these springs will, of course, vary the resistance to movement of the damper. Thus, either this expedient or the one earlier described or both, can be used for the purpose of adjusting the damper to open for any particular degree of draft desired.

In operation, atmospheric pressure acts on the outer face of damper D and the lesser pressure existing in the flue acts on the inner face thereof. There is a differential of pressure acting on the outer area of the damper above its horizontal axis of rotation, tending to open the damper. Opening of the damper is resisted by the torsion of springs 12. When, however, the draft becomes too great, the resulting increase in the differential of pressure overcomes the opposing torsion of the springs and moves the damper inwardly. As the damper moves inwardly, its projected area, measured in the direction of the axis of pipe A, progressively decreases resulting in a progressive decrease in the turning force due to air pressure. At the same time, the resistance to movement of the damper increases as the springs 12 are wound up and subjected to increasing torsional stress. To augment the turning force acting to open the damper and compensate for the decrease in the turning force due to air pressure, the weight of the damper acts through a moment arm which progressively increases in length as the damper opens to turn the damper toward open position. Finally, the opening force due to air pressure becomes substantially zero as the damper moves into substantially horizontal position and the weight of the damper, acting through a moment arm of maximum length with a tendency to turn the damper counterclockwise, is substantially balanced by the torsion of springs 12. Actually, the damper when positioned as in Fig. 2, is not exactly balanced because there should be a slight differential of force to start the damper back toward closed position. The composite effect of the several factors involved in the turning of the damper is to provide progressively decreasing resistance to opening movement of the damper, the maximum resistance being presented when the damper is closed and the minimum when the damper is fully opened. This is what is desired because it is considered essential to have the damper, when started on its movement toward open position, move to fully open position without very much change in the degree of draft.

The construction described is not only extremely simple and inexpensive to manufacture and install but it is also exceedingly sensitive and very effective in securing regulation of the draft with close accuracy within narrow limits at any desired predetermined value. The damper may be of thin sheet metal, very light and possessing little inertia. Its suspension by springs avoids the expense of carefully made pivot bearings, such as would be necessary to reduce pivot friction to a minimum, and eliminates this factor of pivot friction entirely. The springs not only serve to pivotally support the damper but they also, by their tension, balance the weight of the damper (when the latter is in closed position) and by their torsion serve to hold the damper closed until the draft becomes too great, and to close the damper when the draft is reduced to the desired degree.

The invention has been disclosed herein, in an embodiment at present preferred, for illustrative purposes, but the scope of the invention is defined by the appended claims rather than by the foregoing description.

What I claim is:

1. In an automatic draft regulator, a damper, a supporting frame embordering the damper and adapted to be mounted in a vertical plane, a pair of springs for suspending the damper from and within its embordering frame, said springs connected at their inner and adjacent ends to the damper at a point below the center thereof and connected at their other ends to said member one on each side of the damper.

2. In an automatic draft regulator, a damper, a supporting frame embordering the damper and adapted to be mounted in a vertical plane, a pair of coil springs fixed at their inner and adjacent ends to the damper and at their outer ends to said member one on each side of the damper, said springs serving by their tension to balance the weight of the damper when in closed position and suspend it in the desired relation with said frame and serving also by their torsional stress to hold the damper in closed position and resist opening movement thereof.

3. In an automatic draft regulator, a damper, a supporting frame embordering the damper and adapted to be mounted in a vertical plane, a pair of coil springs fixed at their inner and adjacent ends to the damper and at their outer ends to said member one on each side of the damper, said springs serving by their tension to balance the weight of the damper when in closed position and suspend it in the desired relation with said member and serving also by their torsional stress to hold the damper in closed position and resist opening movement thereof, the points at which said springs are fixed to said member and damper being below the horizontal center line of said frame.

4. In an automatic draft regulator, a damper, a supporting frame embordering the damper and adapted to be mounted in a vertical plane, a pair of coil springs fixed at their inner and adjacent ends to the damper and at their outer ends to said member one on each side of the damper, said springs serving by their tension to balance the weight of the damper when in closed position and suspend it in the desired relation with said member and serving also by their torsional stress to hold the damper in closed position and resist opening movement thereof, the points at which said springs are fixed to said member and damper being below the horizontal center line of said frame, and means for varying the vertical positions at which said springs are fixed to said member and said damper.

5. In an automatic draft regulator, a damper, a supporting frame embordering the damper and adapted to be mounted in a vertical plane, a pair of coil springs fixed at their inner and adjacent ends to the damper and at their outer ends to said member one on each side of the damper, said springs serving by their tension to balance the weight of the damper when in closed position and suspend it in the desired relation with said member and serving also by their torsional stress to hold the damper in closed position and resist opening movement thereof, the points at which said springs are fixed to said member and damper being below the horizontal center line of said frame, and means for varying the tension of said springs.

6. In an automatic draft regulator, a damper, a supporting frame embordering the damper and adapted to be mounted in a vertical plane, a pair of coil springs fixed at their inner and adjacent ends to the damper and at their outer ends to said member one on each side of the damper, said springs serving by their tension to balance the weight of the damper when in closed position and suspend it in the desired relation with said member and serving also by their torsional stress to hold the damper in closed position and resist opening movement thereof, the points at which said springs are fixed to said member and damper being below the horizontal center line of said damper, and means for varying the torsional stress of said springs.

LEOLYN F. SPEAR.